(12) United States Patent
Stein et al.

(10) Patent No.: US 6,400,748 B1
(45) Date of Patent: Jun. 4, 2002

(54) METHOD FOR OPERATING AN ELECTRIC ARC FURNACE TO BUILD UP AND MAINTAIN FOAMED SLAG

(76) Inventors: Wilfried Stein, Tillmannsstrasse 19 a, D-58135 Hagen; Karl Stein, Bruckmer Strasse 5, D-58097 Hagen, both of (DE)

( * ) Notice: Subject to any disclaimer, the term of this patent is extended or adjusted under 35 U.S.C. 154(b) by 0 days.

(21) Appl. No.: 09/674,966
(22) PCT Filed: Jul. 3, 1998
(86) PCT No.: PCT/EP98/04115
§ 371 (c)(1), (2), (4) Date: Jan. 8, 2001
(87) PCT Pub. No.: WO99/58730
PCT Pub. Date: Nov. 18, 1999

(30) Foreign Application Priority Data

May 8, 1998 (DE) .......................... 198 20 612

(51) Int. Cl.$^7$ ............................................. H05B 11/00
(52) U.S. Cl. ................................ 373/2; 373/60; 373/85
(58) Field of Search .......................... 373/2, 60, 71–85

(56) References Cited

U.S. PATENT DOCUMENTS 3,459,867 A * 8/1969 Estes ........................... 373/85
4,827,486 A * 5/1989 Brotzmann et al. ............ 373/85
5,373,530 A * 12/1994 Perrin ........................... 373/85

FOREIGN PATENT DOCUMENTS

| BE | 1 007 960 | 11/1995 |
| DE | 228 831 A | 10/1985 |
| EP | 0 637 634 | 2/1995 |
| EP | 0 692 544 | 1/1996 |

\* cited by examiner

Primary Examiner—Tu Ba Hoang
(74) Attorney, Agent, or Firm—Flynn, Thiel, Boutell & Tanis, P.C.

(57) ABSTRACT

In order to operate an electric arc furnace (1) in optimum conditions, especially in order to build up and maintain a certain intensity of foamed slag, the amount of slag builder fed into the furnace (1) and therefore the power consumption of the furnace (1) is regulated according to the current received by the electrodes (2) in such a way that a maximum amount of slag builder is initially added in order to build up said foamed slag until the amount of current received by the electrodes (2) is reduced. Subsequently, the amount of added slag builder is reduced until the amount of current received reaches a predetermined set value. The theoretical amount of current received is kept constant by reducing or increasing the added amount of slag builder.

15 Claims, 2 Drawing Sheets

US 6,400,748 B1

METHOD FOR OPERATING AN ELECTRIC ARC FURNACE TO BUILD UP AND MAINTAIN FOAMED SLAG

FIELD OF THE INVENTION

A marked-up copy of this amendment is enclosed herewith.

The invention relates to a method for operating an electric arc furnace to build up and maintain a foamed slag at a predetermined height over the entire cross-sectional surface of the melting bath by supplying a slag builder, in particular carbon.

BACKGROUND OF THE INVENTION

Since the seventies, freely radiating arcs in a foamy slag are usually driven in the electric arc furnaces. The refractory masonries and water-cooling systems of the furnace are in this manner shielded from the strong emission load. Moreover the electric performance of the furnaces is also evened out. The conditions for the energy transfer through the arc changes constantly in particular during the warming phase due to the processes which take place between the electrode tip, the slag and the bath. In the case of a short-circuit between electrode and bath above the scrap metal, as it can, for example, be caused by a scrap-metal cave-in and bath fluctuations, the then yet supplied energy converts to graphite.

Measurements have shown that the entire electric efficiency of the energy transfer is merely 36%. Whereas if the arc dips with half of its length or, however, completely into the foamed slag, then the radiation energy of the arc is also transferred at half of its amount or completely through heat conduction of the slag to the steel bath. The energy utilization increases then to 65 to 93%. An optimum energy feed input is achieved when a sufficient slag height is available and when the slag due to its specific conductivity can reproduce the arc resistance. The efficiency can hereby rise up to 100% through the additional reduction of the focal-spot losses.

A method for controlling the building of foamed slag in a rotary-current electric arc furnace is known from the EP-A1-0 692 544, in which the feeding of carbon for the building of foamed slag is specified in such a manner that both at least a partial enveloping of the arcs is realized and also an overdosed feeding of carbon is avoided. Here in order to control the throughput rate of carbon an automatic detection of a sound emission of the electric arc furnace is carried out. The amplitude of the sound is evaluated. When a specified sound level is exceeded, the throughput rate is increased, and when the specified sound level is less, the throughput rate is reduced. However, this arrangement is extremely unsatisfactory. The difficulty is now to adjust the slag height to an optimum.

The disadvantage of these conventional methods is that by using the lance manipulators in the area of the slag door, a considerable amount of space is needed, and moreover the lances must be replaced often. Due to the blowing in of the additives in the area of the slag door, the adjoining area preferably produces a high slag, whereas more or less slag exists in the remaining furnace areas. This has significant disadvantages. In particular, the slag forming takes place only in one area so that a sufficient slag is missing in the area opposite the slag door. This is mainly noticeable in electric arc furnaces which have an eccentric bay tapping feature. When in addition filter dust or other solids to be recycled are supplied through the lances, then the amount of the added solids is limited because the addition is concentrated at an area in the furnace area following the slag door. This easily results in formations of solid agglomerates which are difficult to melt. In addition, because of the uneven slag distribution, the know-how of the operating personnel is important most of all in deciding as to when and in what amount the additives must be blown into the electric furnace.

SUMMARY OF THE INVENTION

The basic purpose of the invention is to provide a method for operating an electric arc furnace to build up and maintain foamed slag, with which not only the energy consumption of the electric arc furnace is lowered as a whole, the melting process can be optimized, and also the top-to-top times can be shortened, and the wear of electrode material and refractory solids and the noise development can be reduced, but with which also a significantly quicker build-up of the slag with a uniform distribution in the surface and height of the electric arc furnace is achieved and also additional substances can be added in larger amounts than before.

This purpose is attained according to the invention by the amount of the slag builder fed into the electric arc furnace being regulated in dependency of the current absorbed by the electrodes and thus the absorption performance of the electric arc furnace regulated in such a manner that initially in order to build up the foamed slag, the maximum amount of slag builder is added until the current absorption by the electrodes is reduced, the amount of the added slag builder being subsequently reduced until the current absorption has reached a specified desired value, and the desired current absorption being maintained constant by subsequently reducing or increasing the added amount of slag builder.

Thus the basis of the method of the invention is that the absorption performance of the electrodes is reduced when the foamed slag has reached an optimum height. For this reason, initially at a specified absorption performance of the electric arc furnace, a maximum amount of foamed-slag builder, in particular carbon, is fed to the molten bath, namely, until the absorbed performance is reduced to a specified desired value. When the absorbed performance falls below this desired value, the addition of slag builders is reduced. When it increases again above the desired performance, the addition of slag builders is increased accordingly. This makes it possible to drive an optimum height of foamed slag, whereby the foamed slag is built up in a very short period of time. The slag builder is advantageously added through lances arranged in the wall of the furnace, whereby these lances extend through the wall of the furnace and are arranged approximately uniformly distributed over the periphery of the furnace. The lances are inclined with respect to the flow direction of the melt at an angle of approximately 30 to 80°. The inclination to the horizontal is 10 to 30 °.

The injection surface of the lances on the molten bath surface is chosen such that the injection surface lies in flow direction of the melt in each case in front of the electrode. This moreover assures that the slag is distributed uniformly over the entire surface of the bath. Also additives can moreover be supplied through the lances, whereby the amount of the supplied additives is significantly greater than is the case in common methods, in which these additives are added exclusively through the furnace door by means of lance manipulators. This results in an accumulation of additives in the area of the furnace door, which results in lump formation and thus in agglomerates which are very difficult to melt.

BRIEF DESCRIPTION OF THE DRAWINGS

One exemplary embodiment of the invention will be described hereinafter in greater detail in connection with the drawings, in which.

DETAILED DESCRIPTION

Figure 1:
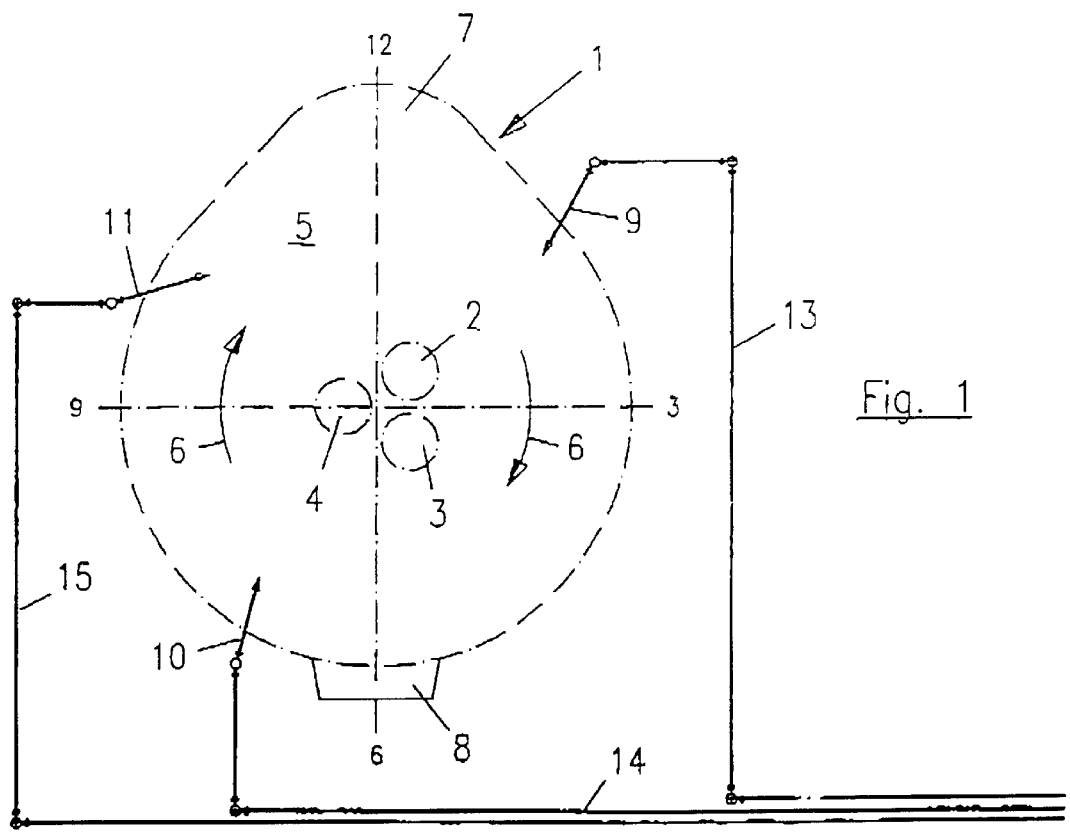
FIGS. 1 and 2 are a schematic top view of an electric arc furnace with lances inserted into the wall of the furnace, which lances are arranged in dependency of the direction of rotation of the molten bath.

FIG. 1 is a top view of an electric arc furnace 1 designed according to the invention, which furnace has three electrodes 2, 3, 4. The arrows 6 identify the direction of rotation of the molten bath 5. The tapping of the furnace is in the area of the bay-like part 7 of the electric arc furnace 1. The furnace door 8 is arranged opposite this bay-like part 7. Three lances 9, 10, 11 are arranged in the wall of the furnace, which lances are inclined with respect to the flow direction 6 of the molten bath 5 to define an angle of 30 to 80° with respect to the flow direction 6. The lances 9, 10, 11 are furthermore also inclined to the horizontal, whereby here an angle of 10 to 30° is maintained. The installation of the lances 9, 10, 11 into the wall of the furnace 12 can be seen from FIG. 3. Through the inclination of the lances to the horizontal and their inclination to the flow direction, a foamed slag can be produced which extends essentially uniformly over the molten bath 5 of the electric arc furnace 1. The injection surface of the lance lies hereby, viewed in flow direction, in each case in front of an electrode so that it is assured that the wall area of the electric arc furnace, which is stressed the most, can always be kept covered with a sufficient foamed slag. The lance end terminates at a height of up to 200 mm above the molten bath level.

Each lance 9, 10, 11 is connected through a separate supply pipeline 13, 14, 15 so that the blower output to the individual lances 9, 10, 11 can be individually controlled and the geometry of the furnace can thus be taken into consideration.

Figure 2:
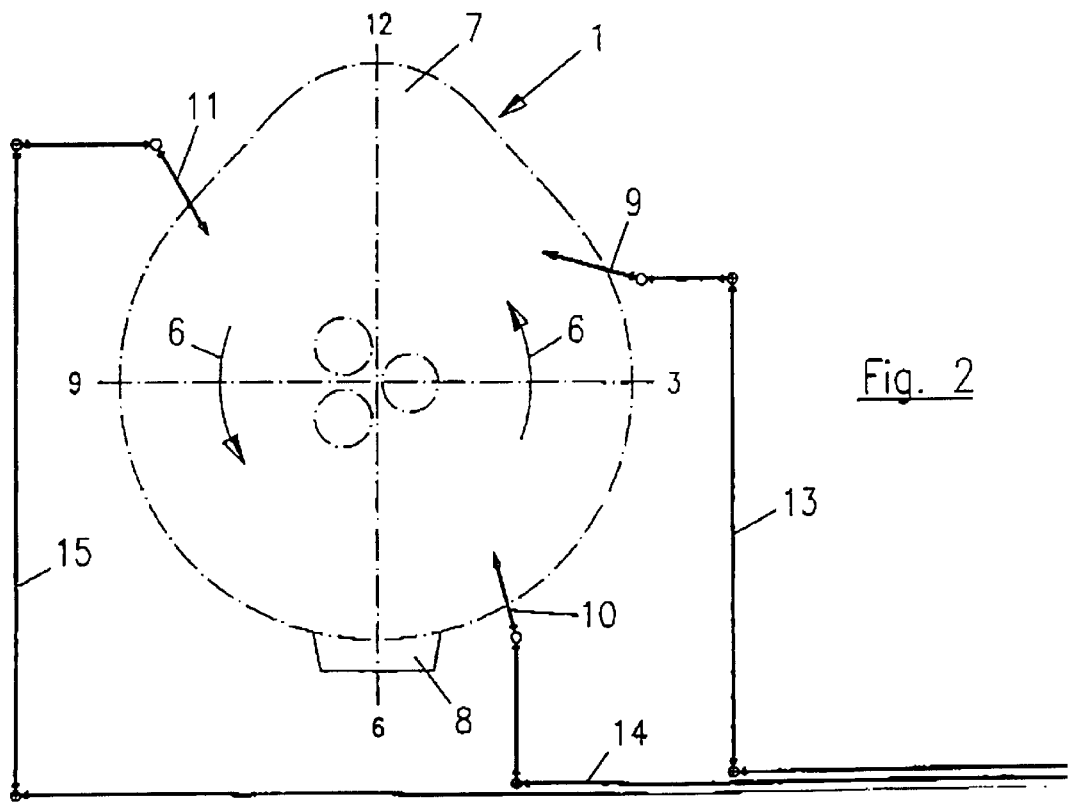

FIG. 2 illustrates an electric arc furnace 1 corresponding to FIG. 1, whereby here merely the direction of rotation 6 of the bath has changed. The inclination of the lances are also correspondingly aligned with respect to the flow direction 6 of the molten bath, whereby the horizontal inclination is the same as in the exemplary embodiment according to FIG. 1.

Figures 3, 4:
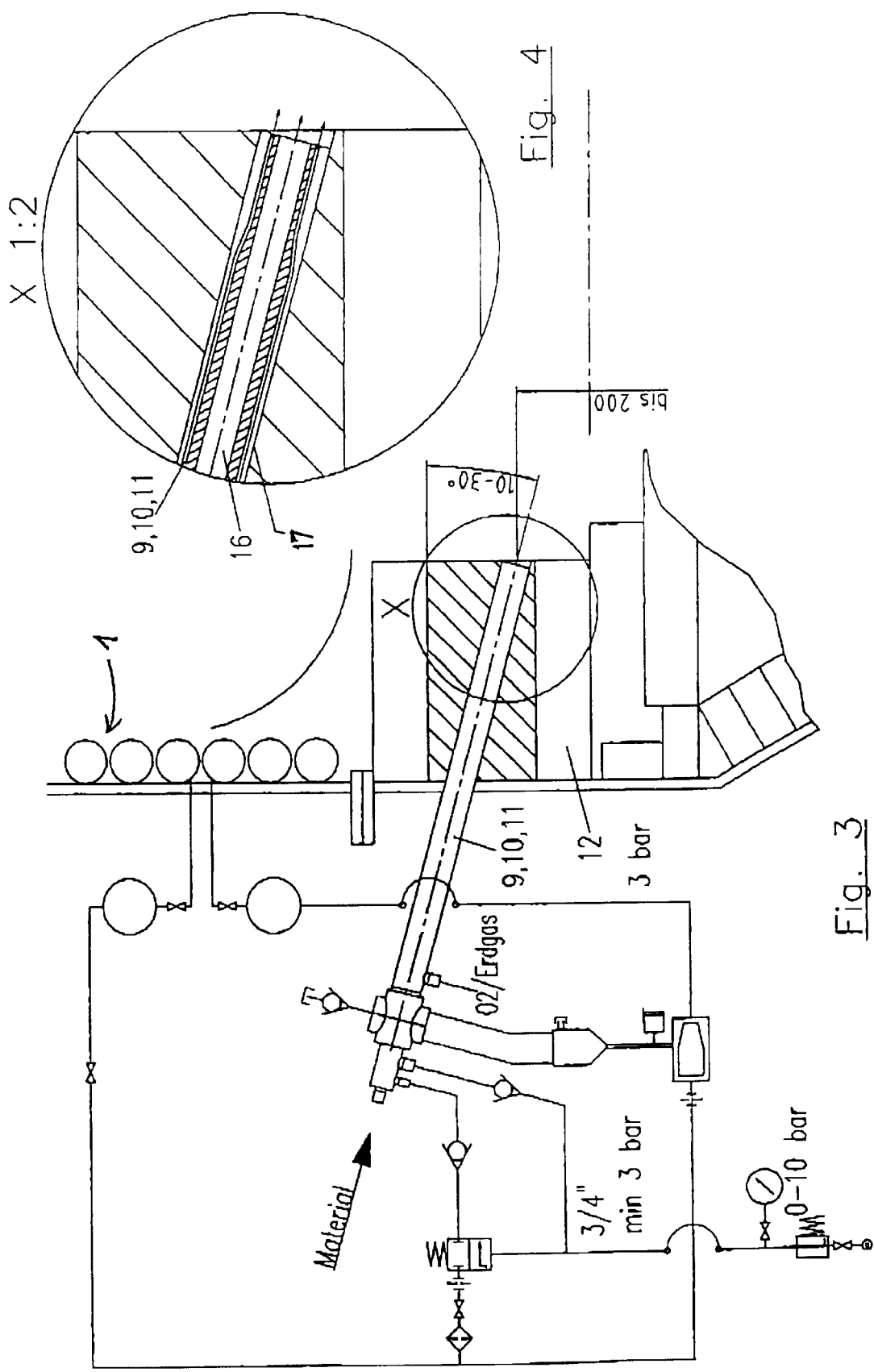
FIG. 3 is a cross-sectional view of the wall of the electric arc furnace with an inserted lance.
FIG. 4 is an enlarged illustration of the lance end according to FIG. 3.

FIG. 3 illustrates a vertical cross section of a wall 12 of the electric arc furnace 1. The lance is here arranged at an angle of approximately 30° in the wall of the furnace, whereby this lance is designed such that simultaneously solids and also gaseous substances can be supplied through said lance. The lance has for this purpose a ceramic insert 17, whereby the solids, in particular carbon, lime and substances to be recycled are guided through the center opening 16 and gaseous substances through the space between the ceramic insert and the outer pipe. This special design of the lances makes it possible to supply through one and the same lance successively or, however, also simultaneously solids and gaseous media.

List of Reference Numerals

| | |
|---|---|
| 1 | Electric arc furnace |
| 2, 3, 4 | electrode |
| 5 | melting bath |
| 6 | direction of rotation of the melting bath |
| 7 | bay tapping |
| 8 | furnace door |
| 9, 10, 11 | lances |
| 9, 10, 11 | feed pipe |
| 12 | wall of the furnace |
| 13, 14, 15 | supply pipeline |
| 16 | opening |
| 17 | ceramic insert |

What is claimed is:

1. A method for operating an electric arc furnace to build up and maintain a foamed slag at a predetermined height over the entire cross-sectional surface of the molten bath by supplying a slag builder, comprising the steps of: feeding a regulated amount of slag builder into the electric arc furnace in dependency of the current absorbed by electrodes in the electric arc furnace, said regulated feeding initially including an amount to build up the foamed slag until the current absorption by the electrodes is reduced subsequently reducing the amount of the added slag builder until the current absorption by the electrodes has reached a specified desired value, and subsequently maintaining the specified desired value of the current absorption constant by reducing or increasing the added amount of slag builder.

2. The method according to claim 1, wherein the amount of the slag builder fed into the electric arc furnace is 3 to 15 kg/t.

3. The method according to claim 1, wherein the slag builder is supplied through lances arranged at a height of up to 200 mm above the bath surface.

4. The method according to claim 3, wherein at least one of filter dust, roll cinder sludge, lime, prepared sludge, alloys and mixtures of the aforesaid substances is added to the slag builder through the lances into the molten bath.

5. The method according to claim 3, wherein alternately slag builder and at least one of filter dust, roll cinder sludge, lime, prepared sludge, alloys and mixtures of the aforesaid substances are added through the lances.

6. The method according to claim 1, wherein each electrode is associated with at least one lance, orienting the lances so that they extend through a wall of the electric arc furnace and are approximately uniformly distributed over the periphery of the electric arc furnace, inclining the lances at an angle in a range of 30° to 80° with respect to a flow direction of the molten bath and at an angle in a range of 10° to 30° with respect to a top surface of the molten bath.

7. The method according to claim 6, wherein each lance is additionally oriented so that a region of the top surface of the molten bath lies in each case in front of the associated electrode as viewed in flow direction of the molten bath.

8. The method according to claim 4, wherein said regulated feeding step additionally includes a controlling and monitoring of a flow of substances in a feed pipe to each individual lance.

9. The method according to claim 3, wherein said slag builder includes carbon and said carbon and at least one of lime, filter dust, prepared sludge and cinder, alloys and mixtures of the aforesaid substances are blown into the molten bath through the lances.

10. The method according to claim 3, wherein part of each of the lances project into an interior of the electric arc furnace, at least the parts of the lances projecting into the interior of the electric arc furnace consisting of at least one of steel and copper, and cooling at least the parts of the lances projecting into the interior of the electric arc furnace by water or air.

11. The method according to claim 3, wherein the lances are continuously loaded with a conveyor gas.

12. The method according to claim 3, wherein during a melting phase, at least one of oxygen and natural gas is additionally blown through the lances into the electric arc furnace.

13. The method according to claim 3, wherein with a start of a warming phase, at least one of carbon and oxygen is alternately blown through the lances into the electric arc furnace.

14. The method according to claim 1, wherein said slag builder includes carbon.

15. The method according to claim 11, wherein said conveyor gas is pressurized air.

* * * * *